US012784190B2

(12) United States Patent
Xia et al.

(10) Patent No.: US 12,784,190 B2
(45) Date of Patent: Nov. 3, 2026

(54) IMAGE DETECTION METHOD AND APPARATUS, DEVICE, AND STORAGE MEDIUM COMPRISING A FIRST IMAGE DETECTION MODEL AND A SECOND IMAGE DETECTION MODEL TO DETERMINE A FIRST TARGET LESION TYPE AND LESION REGION AND A SUBCATEGORY OF THE FIRST TARGET LESION TYPE

(71) Applicant: Alibaba (China) Co., Ltd., Hangzhou (CN)

(72) Inventors: Yingda Xia, North Bethesda, MD (US); Ling Zhang, Rockville, MD (US); Jiawen Yao, Beijing (CN); Le Lu, Bethesda, MD (US); Xiansheng Hua, Zhejiang (CN)

(73) Assignee: Alibaba (China) Co., Ltd., Hangzhou (CN)

( * ) Notice: Subject to any disclaimer, the term of this patent is extended or adjusted under 35 U.S.C. 154(b) by 821 days.

(21) Appl. No.: 18/046,405

(22) Filed: Oct. 13, 2022

(65) Prior Publication Data

US 2023/0410296 A1 Dec. 21, 2023

(30) Foreign Application Priority Data

May 24, 2022 (CN) ......................... 202210575258.9

(51) Int. Cl.
*G06T 7/11* (2017.01)
*G06T 7/00* (2017.01)
(Continued)

(52) U.S. Cl.
CPC .. *G06T 7/0012* (2013.01); *G06T 2207/10081* (2013.01); *G06T 2207/20081* (2013.01); *G06T 2207/30096* (2013.01)

(58) Field of Classification Search
CPC . G06T 2207/10081; G06T 2207/20081; G06T 2207/20084; G06T 2207/30092;
(Continued)

(56) References Cited

U.S. PATENT DOCUMENTS

2020/0000362 A1* 1/2020 Wallace ................. A61B 5/055
2020/0160520 A1* 5/2020 Prosky ................. A61B 5/7264
(Continued)

FOREIGN PATENT DOCUMENTS

CN 106780460 A 5/2017
CN 109949309 A 6/2019
(Continued)

OTHER PUBLICATIONS

Zhao et al. "3D Graph Anatomy Geometry-Integrated Network for Pancreatic Mass Segmentation, Diagnosis, and Quantitative Patient Management". Pertinent Pages: Whole Document. Pub Date: Dec 8, 2022. (Year: 2002).*
(Continued)

*Primary Examiner* — Chad Dickerson
(74) *Attorney, Agent, or Firm* — Finnegan, Henderson, Farabow, Garrett & Dunner, LLP

(57) ABSTRACT

Image detection methods, apparatus, and storage medium are provided. The method includes: acquiring a detection image obtained through computed tomography; extracting a target body part image corresponding to a target body part from the detection image; performing first image classification and segmentation on the target body part image through a first image detection model, to determine whether a first target lesion type and a lesion region corresponding to the first target lesion type exist in the target body part image; and performing second image classification and segmentation on the target body part image through a second image detection model, to determine whether a second target lesion type and
(Continued)

a lesion region corresponding to the second target lesion type exist in the target body part image, wherein the second target lesion type is a subcategory of the first target lesion type.

17 Claims, 6 Drawing Sheets

(51) Int. Cl.
*G06V 10/764* (2022.01)
*G06N 3/02* (2006.01)

(58) Field of Classification Search
CPC G06T 2207/30096; G06T 7/0012; G06T 7/11
USPC .......................................................... 382/128
See application file for complete search history.

(56) References Cited

U.S. PATENT DOCUMENTS

| | | | | |
|---|---|---|---|---|
| 2020/0226748 | A1* | 7/2020 | Kaufman | G06N 3/082 |
| 2020/0410671 | A1 | 12/2020 | Peng et al. | |
| 2021/0012505 | A1* | 1/2021 | Yuille | G06T 7/11 |
| 2022/0180506 | A1* | 6/2022 | Zhao | G16H 20/40 |
| 2023/0342920 | A1* | 10/2023 | Okada | A61B 5/055 |

FOREIGN PATENT DOCUMENTS

| | | | |
|---|---|---|---|
| CN | 110074804 | A | 8/2019 |
| CN | 111209916 | A | 5/2020 |
| CN | 111325739 | A | 6/2020 |
| CN | 111932529 | A | 11/2020 |
| CN | 113469957 | A | 10/2021 |
| CN | 113487621 | A | 10/2021 |
| CN | 113689412 | A | 11/2021 |
| CN | 114140378 | A | 3/2022 |
| CN | 114155234 | A | 3/2022 |
| WO | 2021146199 | A1 | 7/2021 |

OTHER PUBLICATIONS

First Office Action issued in corresponding Chinese Application No. 202210575258.9 on Oct. 31, 2024 (12 pages).

Zhu et al., "A Semantic Segmentation Network Based Real-Time Computer-Aided Diagnosis System for Hydatidiform Mole Hydrops Lesion Recognition in Microscopic View," https://arxiv.org/pdf/2204.04949, 10 pages, 2022.

Office Action issued in corresponding Chinese Application No. 202510686886.8 on Feb. 27, 2026, (14 pages).

Zhao et al., "3D Graph Anatomy Geometry-Integrated Network for Pancreatic Mass Segmentation, Diagnosis, and Quantitative Patient Management," 2021 IEEE/CVF Conference on Computer Vision and Pattern Recognition (CVPR), pp. 13743-13752, 2021.

* cited by examiner

IMAGE DETECTION METHOD AND APPARATUS, DEVICE, AND STORAGE MEDIUM COMPRISING A FIRST IMAGE DETECTION MODEL AND A SECOND IMAGE DETECTION MODEL TO DETERMINE A FIRST TARGET LESION TYPE AND LESION REGION AND A SUBCATEGORY OF THE FIRST TARGET LESION TYPE

CROSS-REFERENCE TO RELATED APPLICATIONS

The disclosure claims the benefits of priority to Chinese Application No. 202210575258.9, filed May 24, 2022, which is incorporated herein by reference in its entirety.

TECHNICAL FIELD

The present disclosure generally relates to artificial intelligence technologies, and more particularly, to an image detection method and apparatus, and a storage medium.

BACKGROUND

Pancreatic cancer is a malignant tumor with a high mortality rate and is not easy to be detected by screening. It is usually at an advanced stage of cancer when the pancreatic cancer can be found, resulting in losing of the opportunity for surgery and a low 5-year survival rate.

At present, for pancreatic-related diseases such as pancreatic cancer, computed tomography (CT) images of patients are usually acquired to assist in diagnosis. Common CT includes two types: contrast-enhanced CT and plain CT. Contrast-enhanced CT requires injection of a contrast agent. The contrast agent has a risk of making a patient allergic and increases costs. In addition, the patient is exposed to more radiation due to the multi-phase image scanning.

However, the CT images may include a lot of valuable information. It is of significance to perform refined detection on the CT images as required.

SUMMARY OF THE DISCLOSURE

Embodiments of the present disclosure provide image detection methods. The methods can include: acquiring a detection image obtained through computed tomography; extracting a target body part image corresponding to a target body part from the detection image; performing first image classification and segmentation on the target body part image through a first image detection model, to determine whether a first target lesion type and a lesion region corresponding to the first target lesion type exist in the target body part image; and performing second image classification and segmentation on the target body part image through a second image detection model, to determine whether a second target lesion type and a lesion region corresponding to the second target lesion type exist in the target body part image, wherein the second target lesion type is a subcategory of the first target lesion type.

Embodiments of the present disclosure provide an apparatus for performing image processing. The apparatus includes a memory configured to store instructions; and one or more processors configured to execute the instructions to cause the apparatus to perform: acquiring a detection image obtained through computed tomography; extracting a target body part image corresponding to a target body part from the detection image; performing first image classification and segmentation on the target body part image through a first image detection model, to determine whether a first target lesion type and a lesion region corresponding to the first target lesion type exist in the target body part image; and performing second image classification and segmentation on the target body part image through a second image detection model, to determine whether a second target lesion type and a lesion region corresponding to the second target lesion type exist in the target body part image, wherein the second target lesion type is a subcategory of the first target lesion type.

Embodiments of the present disclosure provide a non-transitory computer readable medium that stores a set of instructions that is executable by one or more processors of an apparatus to cause the apparatus to perform: acquiring a detection image obtained through computed tomography; extracting a target body part image corresponding to a target body part from the detection image; performing first image classification and segmentation on the target body part image through a first image detection model, to determine whether a first target lesion type and a lesion region corresponding to the first target lesion type exist in the target body part image; and performing second image classification and segmentation on the target body part image through a second image detection model, to determine whether a second target lesion type and a lesion region corresponding to the second target lesion type exist in the target body part image, wherein the second target lesion type is a subcategory of the first target lesion type.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
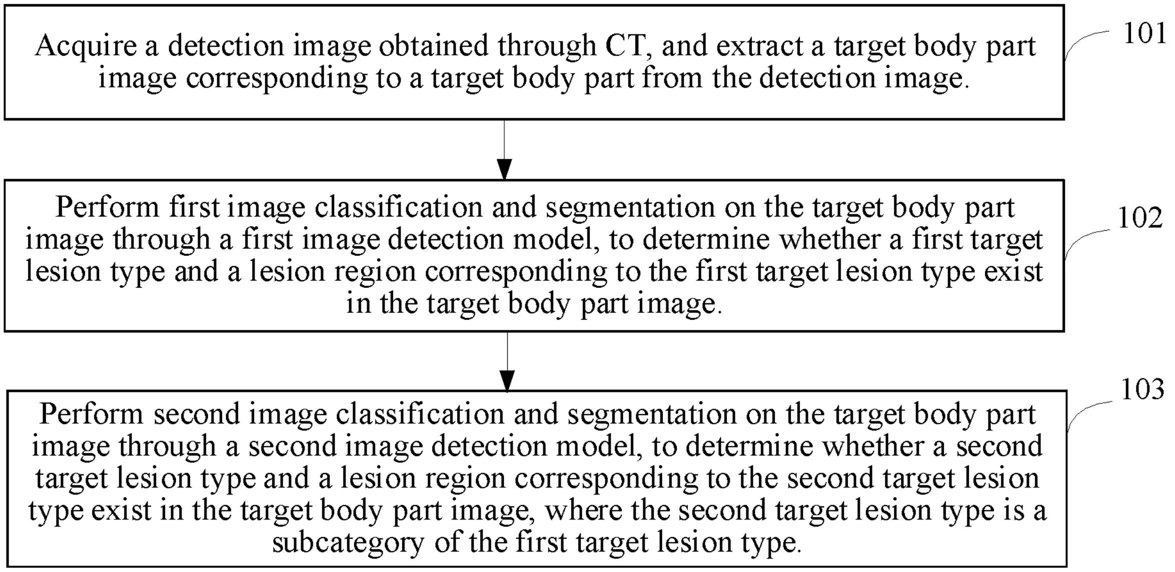
FIG. 1 is a flowchart of an exemplary image detection method, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

In actual life, using pancreatic cancer as an example, so far, there is no officially recommended pancreatic cancer screening means. Most pancreatic cancer patients are found at an advanced stage, resulting in losing of the opportunity for surgery and a very low 5-year survival rate. If pancreatic cancer can be found early, through postoperative adjuvant chemotherapy, the 5-year survival rate is expected to be greatly improved.

The diagnostic imaging method for pancreatic cancer is using contrast-enhanced CT, which requires injecting a contrast agent to a user (the user in this disclosure refers to a person on which disease detection needs to be performed, generally, a patient). However, the contrast agent has a risk of making a patient allergic and increases costs. In addition, the patient is exposed to more radiation due to the multi-phase image scanning.

The plain CT for the chest is being widely used for physical examination, with a scan range including most of the pancreas. However, the contrast of a plain CT image is relatively low, and it is difficult for a doctor to determine whether there is a tumor or cancer on the pancreas with naked eyes. In fact, it often happens that a pancreatic tumor is missed during a physical examination, which is one of the reasons why pancreatic cancer is usually found at an advanced stage.

In actual life, in addition to malignant pancreatic cancer such as pancreatic ductal adenocarcinoma (PDAC), pancreas-related diseases further include pancreatic diseases such as primitive neuroectodermal tumor (PNET), intraductal papillary mucinous neoplasm (IPMN), serous cystadenoma (SCN), mucinous cystic neoplasm (MCN), solid pseudopapillary tumor (MCN) solid pseudopapillary tumor of the pancreas (SPT), and chronic pancreatitis (CP).

Taken the above-mentioned pancreas-related diseases for example, in the embodiments of the present disclosure, detection of common lesion types of the pancreas can be considered to be divided into two classification and segmentation tasks. The first task is identifying three categories: PDAC, a non-PDAC disease (including subtypes such as PNET, SPT, IPMN, MCN, CP, and SCN), and no disease, as well as a lesion region corresponding to each lesion type based on a plain CT image. The second task is further performing subtype classification and identification based on the plain CT image if an output result of the first task is a non-PDAC type or is PDAC.

Distinguishing PDAC from other non-PDAC-type disease classifications is a very important classification because PDAC accounts for 90% of pancreatic cancers and is the most malignant pancreatic cancer.

The two classification and segmentation tasks are briefly described by using the only the foregoing pancreas as an example. Actually, detection of other body parts is the same. The image detection methods provided in the embodiments of the present disclosure are not limited to detection of specific diseases in some specific parts, and an image detection method applicable to many lesion types of many body parts is provided, for example, lung cancer, tuberculosis, and pulmonary edema of the lungs, and the like.

The image detection method provided in the embodiments of the present disclosure is only learning lesion features presented in images through a neural network model to achieve accurate detection of a lesion type and a lesion region that may be included in the image. The detection result is used as intermediate result information to provide to a doctor.

The image detection method provided in the embodiments of the present disclosure is specifically described below.

FIG. 1 is a flowchart of an exemplary image detection method, according to some embodiments of the present disclosure. As shown in FIG. 1, the method includes steps 101 to 103.

At step 101, a detection image obtained through CT is acquired, and a target body part image corresponding to a target body part is extracted from the detection image. The detection image can be obtained through plain CT.

At step 102, first image classification and segmentation are performed on the target body part image through a first image detection model to determine whether a first target lesion type and a lesion region corresponding to the first target lesion type exist in the target body part image.

At step 103, second image classification and segmentation are performed on the target body part image through a second image detection model to determine whether a second target lesion type and a lesion region corresponding to the second targe lesion type exist in the target body part image. The second target lesion type is a subcategory of the first target lesion type.

In actual life, detection of many diseases needs to be assisted by medical images. CT is a common auxiliary method. In the embodiments of the present disclosure, when detection of a specific disease needs to be performed on a specific user, only a plain CT scan is required to be performed on the user without performing contrast-enhanced CT. An image obtained through plain CT is referred to as a detection image.

During CT image acquisition, the entire region of the user, for example, the chest or abdomen, is usually scanned. However, judgment of some diseases requires to only pay attention to a specific body part (target body part) therein, for example, one or more organs. Using screening of pancreas-related diseases as an example, the target body part concerned is the pancreas. Therefore, after the detection image is obtained, to facilitate an image identification procedure, an image region corresponding to the target body part needs to be extracted from the detection image, and is referred to as a target body part image, for example, the pancreas region image.

In an actual application, a segmentation model can be pre-trained for segmenting the target body part image from the detection image.

Using the pancreas as an example, in a training phase of the segmentation model, a large quantity of training sample images with labeled information can be obtained. The training sample image is an image including the pancreas region. The labeled information illustrates a position corresponding to the pancreatic region in the image, and is usually marked with a polygonal box, indicating that pixels in the polygonal box all correspond to the pancreatic region. The segmentation model can be trained based on the training sample images with labeled information. The segmentation model that has been trained until being convergent is capable of locating the pancreas region.

After the detection image is inputted into the segmentation model, the segmentation model can predict category labels corresponding to pixels in the detection image whether a pixel is located within the pancreas region. Assuming that a category label 1 is used to represent the pancreatic region, and a category label 0 is used to represent a non-pancreatic region, based on the category labels corresponding to the pixels, a continuous region formed by pixels corresponding to the category label 1 can be determined as the pancreas region, that is, an image region corresponding to the target body part. The "continuous region" means that even there is a particularly small quantity of pixels of which category labels are 0 between a large quantity of pixels corresponding to the category label 1, the category labels 0 of the pixels are ignored. A specific method for determining a continuous region can be implemented by referring to the existing related art, and details are not described in this embodiment.

Using a pancreatic disease screening scenario as an example, a pancreatic disease screening task is divided into two classification and segmentation tasks. The first classification and segmentation task is used for performing classification and image segmentation for the first group of lesion types on the target body part image. The second classification and segmentation task is used for performing classification and image segmentation for the second group of lesion types on the target body part image.

The image segmentation herein refers to locating a lesion region corresponding to a corresponding lesion type in the target body part image. The classification is classifying and identifying the lesion type.

For pancreatic diseases, the first group of lesion types may include a PDAC type, a non-PDAC type, and non-lesion (that is, normal), and the second group of lesion types may include types such as PNET, SPT, IPMN, MCN, CP, and SCN, and may even also include PDAC.

In some embodiments, the second group of lesion types may be considered as a subcategory under the non-PDAC type. Therefore, in an actual application, when a lesion type corresponding to the target body part outputted by the first classification and segmentation task in the first group of lesion types is a non-PDAC type, the second classification and segmentation task can be performed.

It should be noted that the second classification and segmentation task is configured to be performed when the output result of the first classification and segmentation task indicates PDAC or a non-PDAC type (that is, there is a disease) existed in the target body part. In this case, the second classification and segmentation task need to provide a function of classifying PDAC and a subtype (subcategory) of the non-PDAC type.

Based on the foregoing examples of pancreatic diseases, in summary, the first image detection model is configured to perform detection for a first group of lesion types, where the first group of lesion types includes: a third target lesion type, the first target lesion type, and no lesion that are divided in sequence according to a disease severity corresponding to the target body part, where the first target lesion type refers to a collective name of lesion types other than the third target lesion type. That is to say, the first target lesion type does not point to a specific disease, and instead, indicates that there is an abnormal case of a disease other than the third target lesion type.

In an actual application, the foregoing two classification and segmentation tasks can be completed by respectively training two image detection models, that is, a first image detection model and a second image detection model.

It may be understood that, if an output result of the first image detection model for the target body part image is that a third target lesion type and a lesion region corresponding to the third target lesion exist. In this case, in some embodiments, a processing procedure of the second image detection model can be omitted.

Dividing the image detection task into the foregoing two classification and segmentation tasks has following advantages:

First, compared with completing an image detection task with one model, two image detection models may have their own focuses, which makes it easy to train a more disease-focused model with good performance, thereby reducing the impact of sample imbalance on model performance.

Second, diseases related to the same organ are divided into the foregoing two categories: The first group includes the severest disease, no disease, and a collective name of other diseases, to ensure that the first image detection model can fully learn features of the severest disease and features of the organ in normal (no disease), to ensure the detection accuracy of the severest disease, thereby ensuring the timely detection of this malignant disease. The first classification and segmentation task is equivalent to a coarse classification and segmentation task, which identifies whether a patient has a disease and whether the patient has a specific type of disease. The second classification and segmentation task is equivalent to a refined classification and segmentation task, and a second image detection model corresponding to the second task is trained to learn fine-grained discriminative features of more types of diseases, thereby ensuring the higher accuracy of the image detection result.

Third, an actual application need is also taken into account. Because the first image detection model completes classification and segmentation of the first group of lesion types, not only whether a patient has the severest disease can be learned of based on the classification result, but also a lesion region of the patient can be learned of based on the segmentation result.

It is appreciated that the second image detection model provided in the foregoing embodiments can be selected and used based on an actual need.

To sum up, after the target body part image is located from the detection image, the target body part image is inputted into the first image detection model. The first image classification and segmentation are performed on the target body part image for the first group of lesion types through the first image detection model to obtain a lesion type existing in the first group of lesion types and a corresponding lesion region in the target body part image. If there is a first target lesion type (referring to specified one or more lesion types) included in the first group of lesion types in the target body part image, second image classification and segmentation for the second group of lesion types is performed on the target body part image through a second image detection model to determine that there is a second target lesion type existing in the second group of lesion types and a corresponding lesion region in the target body part image.

Because the foregoing two image detection models need to provide classification and image segmentation capabilities, in the model training processes, training sample images with two types of labeled information need to be obtained. One type of labeled information is a lesion type (included in a corresponding group of lesion types) included in the training sample image, and the other type is a position of the lesion region corresponding to the lesion type in the training sample image.

In some embodiments, both the first image detection model and the second image detection model can be trained by using the following cross-authentication training method. For the ease of description, the first image detection model and the second image detection model are respectively used as the target image detection models. The training process for the target image detection model includes the following steps: obtaining a training sample set used for training the target image detection model; constructing a plurality of training sample subset corresponding to the training sample set; and training a plurality of target image detection models respectively through the plurality of training sample subsets.

For example, assuming that there are in total 100 sample images in a training sample set of a target image detection model, a total of 5 target image detection models (different image detection models) are trained, a training sample subset corresponding to each target image detection model includes 80 sample images sampled from the 100 sample images (training sample subsets corresponding to the target image detection models are different), and the remaining 20 sample images are used as a test set of the corresponding target image detection model.

Through the foregoing training method, a plurality of different first image detection models and a plurality of different second image detection models can be obtained. Based on this, first image classification and segmentation can be performed on the target body part image through a plurality of first image detection models respectively to obtain respective output results of the plurality of first image detection models. Whether there is a lesion region corresponding to the first lesion type in the target body part image is determined according to the respective output results of the plurality of first image detection models.

In some embodiments, an output result with a high proportion can be selected from the respective output results of the plurality of first image detection models as a final output result. For example, if 4 first image detection models in 5 first image detection models output a classification result of PDAC, and respectively output a same lesion region, a lesion type existing in the target body part image is determined as PDAC. The lesion region is a lesion region outputted by the 4 first image detection models.

The same is true for determining that there is a second lesion type and a lesion region in the target body part image through a plurality of second image detection models.

In conclusion, with reference to the image detection method provided in the embodiments of the present disclosure, using a pancreatic disease screening scenario as an example, through the synergistic cooperation of the foregoing two image detection models, accurate detection of severe diseases can be implemented based on the first image detection model which is trained to have a function of identifying a small quantity of severe diseases. Some other types of diseases can be detected based on the second image detection model, thereby implementing comprehensive and accurate identification for a plurality of lesion types in a pancreas image.

Figure 2:
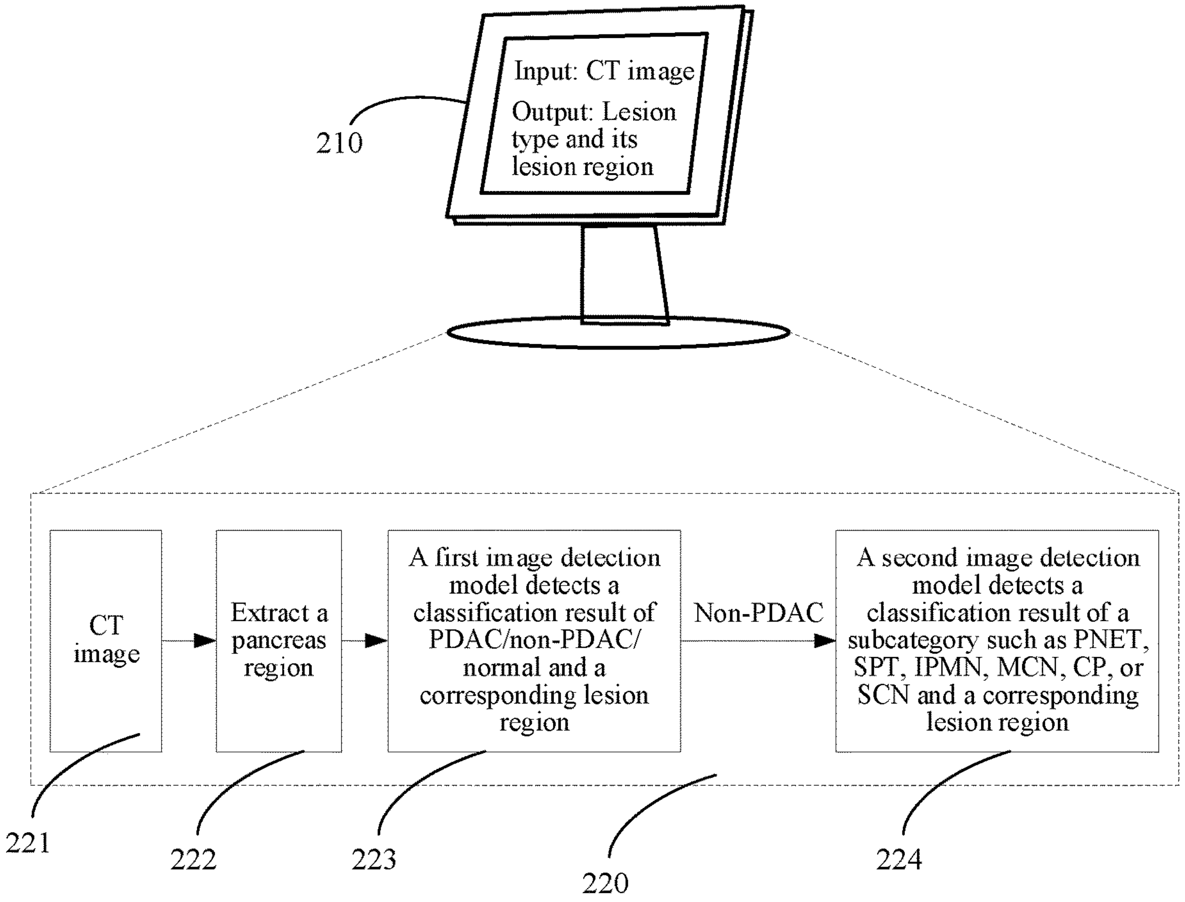
FIG. 2 is a schematic application diagram illustrating an exemplary pancreatic disease screening process, according to some embodiments of the present disclosure.

FIG. 2 illustrates a pancreas image detection process implemented with reference to a detection method, according to some embodiments of the present disclosure. As shown in FIG. 2, a pancreas image detection process 220 includes the following steps. A CT image is acquired 221. A pancreas region is extracted from the CT image 222. A first classification and segmentation are performed using a first image detection model 223. A second classification and segmentation are performed using a second image detection model 224. An I/O device 210 is configured to input the CT image and output the lesion type and corresponding lesion region obtained by the process 220.

Structures and working procedures of the first image detection model and the second image detection model are described below.

The structure and working procedure for the first image detection model are described as below.

From the perspective of structure, the first image detection model includes a first feature extraction sub-model and a first classification and segmentation sub-model. The first feature extraction sub-model includes a first encoding module, a first decoding module, and a jumper layer between the first encoding module and the first decoding module.

From the perspective of the working procedure, the work procedure is as follows: extracting a first feature map group corresponding to the target body part image through the first encoding module, where the first feature map group includes feature maps of a plurality of scales; inputting the first feature map group to the first decoding module through the jumper layer; obtaining a second feature map group corresponding to the target body part image through the first decoding module, where the second feature map group includes feature maps of a plurality of scales; inputting the second feature map group to the first classification and segmentation sub-model to perform fusion on the feature maps included in the second feature map group through the first classification and segmentation sub-model; and determining, based on the fused feature map, whether there is a first target lesion type and a lesion region corresponding to the first target lesion type in the target body part image.

Figure 3:
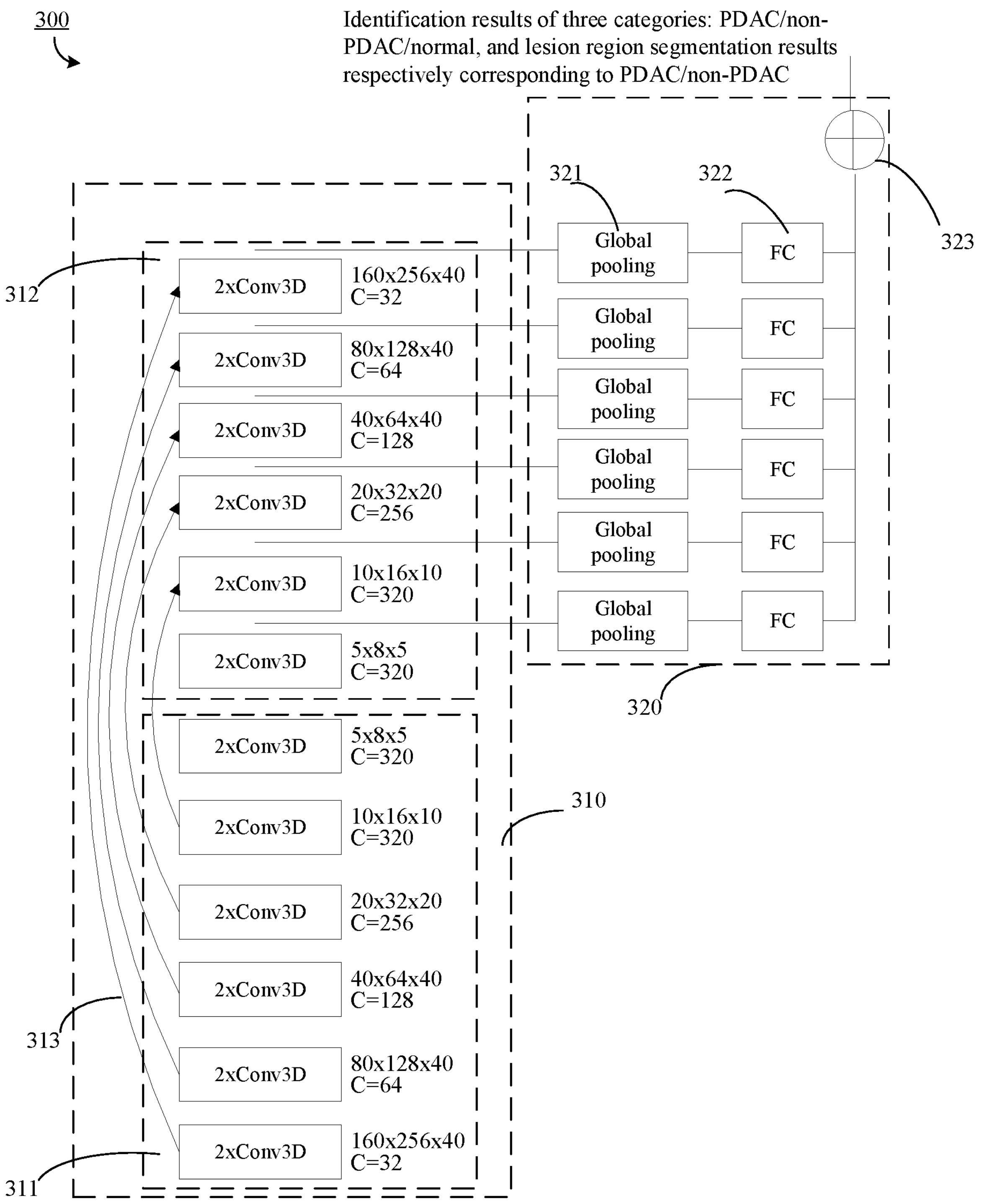
FIG. 3 is a schematic composition diagram of a first image detection model, according to some embodiments of the present disclosure.

For the ease of understanding, the composition of the first image detection model 300 is exemplified with reference to FIG. 3.

As shown in FIG. 3, the first image detection model 300 includes a first feature extraction sub-model 310 and a first classification and segmentation sub-model 320. Assuming that the first encoding module 311 includes 6 convolution blocks, correspondingly, the first decoding module 312 also includes 6 convolution blocks, where each convolution block is represented as: 2×Conv3D, which means including 2 serial three-dimensional (3D) convolutional layers. The convolution blocks correspond to different scales, and used for extracting feature maps of corresponding scales, for example, 5×8×5, 10×16×10, 20×32×20, . . . , shown in FIG. 3, where C=320, 256, 128 . . . , and C represents a quantity of channels. A directed connecting line 313 between corresponding convolution blocks of the same scale in the first encoding module 311 and the first decoding module 312 shown in FIG. 3 represents a jumper layer between convolution blocks of the same scale.

Based on the structure of the first feature extraction sub-model 310 shown in FIG. 3, when the target body part image is inputted to the first encoding module 311, the target body part image is subjected to convolution and down sampling of the foregoing 6 convolution blocks sequentially to sequentially obtain feature maps of 6 scales in descending order by scale. An output of a previous convolution block is used as an input of a next convolution block. An output of the last convolution block in the first encoding module 311 is inputted to the first decoding module 312. The first decoding module performs up sampling and deconvolution layer by layer sequentially through 6 convolution blocks, and sequentially outputs feature maps of 6 scales in ascending order by scale. After one convolution block in the first decoding module obtains a feature map of a scale j by up sampling a feature map of a specific scale i inputted by the previous convolution block, a jumper layer is needed to perform concatenation on a feature map of a scale j extracted from the first encoding module and the feature map before a subsequent operation, such as convolution, is performed. That is, the function of the jumper layer is concatenating feature maps of the same scale obtained through down sampling (encoding module) and up sampling (decoding module) on the channel dimension.

Feature maps of a plurality of scales extracted by the first encoding module 311 are actually shallow features, forming a first feature map group. Moreover, feature maps of a plurality of scales extracted by the first decoding module 312 are actually deep features, forming a second feature map group. Fusion of features is implemented by jumping.

As shown in FIG. 3, the first classification and segmentation sub-model 320 may include a plurality of pooling layers 321 (for example, the global max pooling layer) and a fully connected layer (FC) 322 connected to each pooling layer, and further include a feature fusion layer 323. The feature maps of a plurality of scales included in the second feature map group are correspondingly inputted into the plurality of pooling layers 321 for compression.

Finally, the compressed feature maps of a plurality of scales are inputted into the feature fusion layer 323 for feature fusion (concatenation). Based on the fused feature map, whether there is a lesion region corresponding to a first target lesion type in the target body part image is determined, for example, identification results of three categories of PDAC/non-PDAC/normal, and lesion region segmentation results respectively corresponding to PDAC/non-PDAC as shown in FIG. 3, to enhance the interpretability.

The structure and working procedure for the second image detection model are described as below.

From the perspective of structure, the second image detection model includes a second feature extraction sub-model, a second classification and segmentation sub-model, and a pooling module. The second classification and segmentation sub-model includes a memory unit and an attention module. The memory unit is trained to store positions and visual features corresponding to different lesion types included in the first target lesion type in the target body part, and the memory unit is configured to store the positions and the visual features with a target quantity of memory vectors.

From the perspective of the working procedure, the work procedure is described as below.

A third feature map group corresponding to the target body part image is extracted through the second feature extraction sub-model, where the third feature map group includes feature maps of a plurality of scales.

For a target feature map in the feature maps of a plurality of scales, following steps are performed in sequence: performing pooling on the target feature map through the pooling module, to compress the target feature map into the target quantity of feature vectors; performing cross-attention processing on the target quantity of reference vectors and the target quantity of feature vectors through the attention module; performing self-attention processing on the target quantity of reference vectors; and performing summation of a cross-attention processing result and a self-attention processing result. When the target feature map is the first feature map in the feature maps of the plurality of scales, the reference vector is the memory vector. When the target feature map is not the first feature map in the feature maps of the plurality of scales, the reference vector is a summation result of a cross-attention processing result and a self-attention processing result corresponding to a previous target feature map. The target feature map is any one in the third feature map group.

A second target lesion type and a lesion region corresponding to the second target lesion type exist in the target body part image are determined according to a summation result of a cross-attention processing result and a self-attention processing result corresponding to the last target feature map.

In fact, similar to the first feature extraction sub-model in the first image detection model, the second feature extraction sub-model also includes a second encoding module, a second decoding module, and a jumper layer between the second encoding module and the second decoding module. Based on this, in some embodiments, the extracting the third feature map group corresponding to the target body part image through the second feature extraction sub-model may be implemented as follows: extracting a fourth feature map group corresponding to the target body part image through the second encoding module; inputting the fourth feature map group to the second decoding module through the jumper layer; obtaining a fifth feature map group corresponding to the target body part image through the second decoding module; and determining some feature maps included in the fourth feature map group and some feature maps included in the fifth feature map group to form the third feature map group.

In addition, in some embodiments, the second image detection model may further include a position embedding module. The performing cross-attention processing on the target quantity of reference vectors and the target quantity of feature vectors through the attention module may be implemented as follows: superimposing corresponding position embedding vectors on the target quantity of feature vectors respectively, where a position embedding vector superimposed on any feature vector is used for representing position information corresponding to the any feature vector in the target quantity of feature vectors; and performing, through the attention module, cross-attention processing on the target quantity of reference vectors and the target quantity of feature vectors on which the position embedding vectors respectively corresponding thereto are superimposed.

The introduction of the position embedding vector is essentially introduction of a spatial position feature of the disease on the target body part, which helps to achieve a more accurate identification effect.

Figure 4:
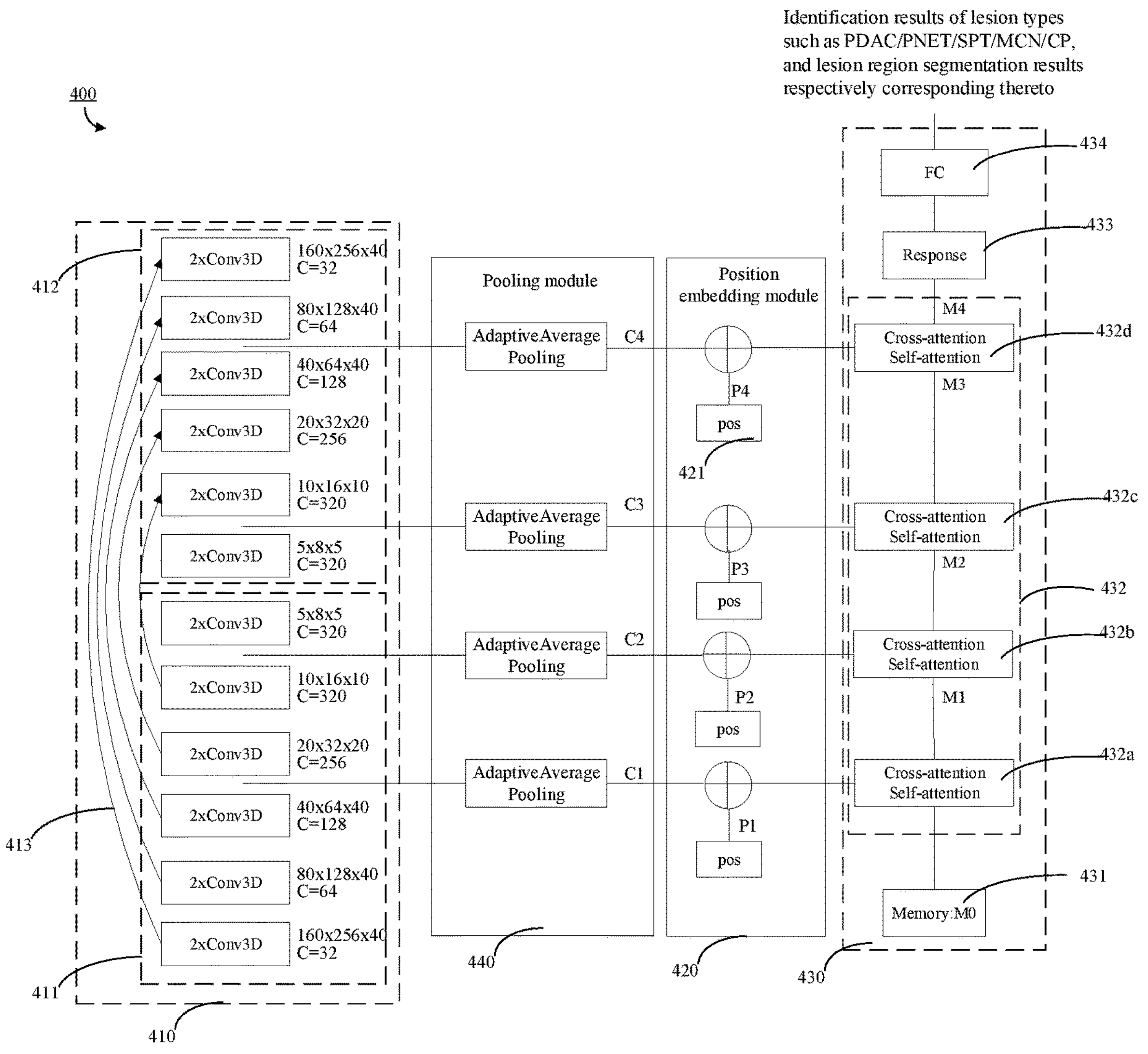
FIG. 4 is a schematic composition diagram of a second image detection model, according to some embodiments of the present disclosure.

For the ease of understanding, the composition of the second image detection model 400 is exemplified with reference to FIG. 4.

As shown in FIG. 4, the second image detection model 400 includes a second feature extraction sub-model 410, a position embedding module 420, a second classification and segmentation sub-model 430, and a pooling module 440.

Similar to FIG. 3, assuming that the second encoding module 411 includes 6 convolution blocks, correspondingly, the second decoding module 412 also includes 6 convolution blocks, where composition and related parameters of each convolution block are shown in FIG. 4. A directed connecting line 413 between corresponding convolution blocks of the same scale in the second encoding module and the second decoding module shown in the figure represents a jumper layer between convolution blocks of the same scale.

The same as the working procedure of the first feature extraction sub-model described above, based on the structure of the second feature extraction sub-model shown in FIG. 4, when the target body part image is inputted to the second encoding module 411, the target body part image is subjected to convolution and down sampling of the foregoing 6 convolution blocks sequentially, to sequentially obtain feature maps of 6 scales in descending order by scale, forming a fourth feature map group. The second decoding module 412 performs up sampling and deconvolution layer by layer sequentially through 6 convolution blocks, and sequentially outputs feature maps of 6 scales in ascending order by scale, forming a fifth feature map group.

Subsequently, as shown in FIG. 4, some feature maps are selected from the fourth feature map group and the fifth feature map group respectively to form a third feature map group.

It should be noted that theoretically, the third feature map group may include all feature maps included in the fourth feature map group and the fifth feature map group, which, however, increases the computational complexity. In addition, because the fourth feature map group and the fifth feature map group respectively correspond to shallow features and deep features respectively, some feature maps are selected from the fourth feature map group and the fifth feature map group respectively, so that the shallow features, the deep features, and computation amount can all be taken into consideration.

Then, for each feature map in the third feature map group, pooling is performed on the each feature map through the pooling module 440, to compress the feature map into a target quantity of feature vectors. The pooling module 440 can provide adaptive average pooling as shown in FIG. 4. In FIG. 4, it is assumed that the target quantity is 5×8×5=200, which matches the size of 200 320-dimensional vectors stored in the memory unit 431.

In the feature map of a plurality of scales shown in FIG. 4, the smallest scale is 5×8×5, and other scales are integer multiples of this scale. Therefore, feature maps of other scales can be compressed by using the scale 5×8×5 as a reference, and a compression result is represented by 200 feature vectors.

In some embodiments, after the each of feature maps in the third feature group is compressed into the target quantity of feature vectors, a corresponding position embedding vector (pos) 421 can be further superimposed on each feature vector in the target quantity of feature vectors. A position embedding vector superimposed on any feature vector is used for representing position information corresponding to the any feature vector in the target quantity of feature vectors.

Then, as shown in FIG. 4, cross-attention processing is performed through the attention module 432 on the target quantity of reference vectors. The target quantity of feature vectors on which respective corresponding position embedding vectors are superimposed. Self-attention processing is performed on the target quantity of reference vectors. Summation of a cross-attention processing result and a self-attention processing result is performed.

The target quantity of reference vectors are rooted from the target quantity of memory vectors stored in the memory unit 431. The target quantity of memory vectors stored in the memory unit 431 are updated and learned in a training process of the second image detection model. During model convergence, the target quantity of memory vectors stored in the memory unit 431 are finally stored for subsequent use.

As shown in FIG. 4, after being subjected to the foregoing compression and position embedding, each feature map in the third feature map group is equivalent to forming a vector sequence, and all vector sequences are sequentially inputted to the attention module 432. Therefore, the attention module 432 can be considered to include a plurality of attention units 432*a*-432*d* shown in FIG. 4. Each attention unit 432*a*-432*d* provides functions of a self-attention mechanism and a cross-attention mechanism.

For the ease of description and understanding, the target quantity of feature vectors of the 4 feature maps in the third feature map group shown in FIG. 4 after pooling are represented as C1, C2, C3, and C4 respectively. 4 corresponding position embedding vectors are represented as P1, P2, P3, and P4 respectively. The target quantity of memory vectors stored in the memory unit 431 are represented as M0. The self-attention processing of the first attention unit 432*a* on the target quantity of memory vectors is represented as: self-attention(M0)=$M_{01}$, where the cross-attention processing performed by the first attention unit 432*a* on the target quantity of memory vectors and the target quantity of feature vectors C1 on which the position embedding vectors respectively corresponding thereto are superimposed is represented as: cross-attention(C1+P1, M0)=$M_{02}$, where C1+P1 represents superimposition of the target quantity of feature vectors C1 and their respective corresponding position embedding vectors.

Summation of the self-attention processing result and the cross-attention processing result is recorded as: $M_{01}$+$M_{03}$=M1, so that M1 is an input of a next attention unit (for example, attention unit 432*b*): a target quantity of reference vectors.

The self-attention processing of the second attention unit 432*b* on the current target quantity of reference vectors M1 is represented as: self-attention(M1)=$M_{11}$, where the cross-attention processing performed by the second attention unit 432*b* on the target quantity of reference vectors and the target quantity of feature vectors C2 on which the position embedding vectors respectively corresponding thereto are superimposed is represented as: cross-attention(C2+P2, M1)=$M_{12}$, current summation of the self-attention processing result and the cross-attention processing result is recorded as: $M_{11}$+$M_{12}$=M2.

By analogy, the self-attention processing of the third attention unit 432*c* on the current target quantity of reference vectors M2 is represented as: self-attention(M2)=$M_{21}$, where the cross-attention processing performed by the third attention unit 432*c* on the target quantity of reference vectors and the target quantity of feature vectors C3 on which the position embedding vectors respectively corresponding thereto are superimposed is represented as: cross-attention (C3+P3, M2)=$M_{22}$, current summation of the self-attention processing result and the cross-attention processing result is recorded as: $M_{21}$+$M_{22}$=M3. The self-attention processing of the fourth attention unit 432*d* on the current target quantity of reference vectors M3 is represented as: self-attention(M3) =$M_{31}$, where the cross-attention processing performed by the fourth attention unit 432*d* on the target quantity of reference vectors and the target quantity of feature vectors C4 on which the position embedding vectors respectively corresponding thereto are superimposed is represented as: cross-attention(C4+P4, M3)=$M_{32}$, current summation of the self-attention processing result and the cross-attention processing result is recorded as: $M_{31}$+$M_{32}$=M4.

Then, a second target lesion type and a lesion region exist in the target body part image are determined according to the M4. For example, specific pooling is performed on 200 320-dimensional vectors corresponding to M4 through a response module 433 shown in FIG. 4, a feature value is selected from each vector and inputted to the following fully connected layer (FC) 434, and then, prediction results of a lesion type and a lesion region are outputted.

In this example, the memory unit 431 is configured to store a set of globally shared model parameters. In a model training phase, initial values in the memory unit 431 can be determined randomly, and then, the parameters are updated during each iteration of the model training. The memory unit 431 is designed to learn of global context information and position information, for example, a relative position of a pancreatic tumor in the pancreas, thereby providing a distinguishable descriptor for each pancreatic disease type included in the first target lesion type (the second group of lesion types). That is, the memory unit 431 aims at storing feature information, such as positions (spatial) and textures (visual), of different pancreatic diseases. The feature information needs to be updated and constructed by using the self-attention mechanism and the cross-attention mechanism.

The image detection method provided in the embodiments of the present disclosure can be executed in the cloud. A plurality of computing nodes can be deployed in the cloud. Each computing node has processing resources such as computing and storage resources. In the cloud, a plurality of computing nodes can be organized to provide a specific service. Certainly, one computing node can also provide one or more services. A manner in which the cloud provides the service may be providing a service interface externally, and a user may use a corresponding service by invoking the service interface. A service interface includes forms such as a software development kit (SDK) and an application programming interface (API).

For the examples provided in the embodiments of the present disclosure, the cloud may provide a service interface with an image detection service. The user invokes the service interface through user equipment to trigger an image detection request to the cloud. The request includes a detection image obtained through plain computed tomography. The cloud determines a computing node that responds to the request, and performs the following steps by using processing resources in the computing node.

A target body part image corresponding to a target body part is extracted from the detection image.

First image classification and segmentation is performed on the target body part image through a first image detection model, to determine that there is a first target lesion type and a lesion region corresponding to the first target lesion type in the target body part image.

Second image classification and segmentation is performed on the target body part image through a second image detection model, to determine that there is a second target lesion type and a lesion region in the target body part image, where the second target lesion type is a subcategory of the first target lesion type.

The detection image marked with the second target lesion type and the lesion region are feed back to the user equipment.

For the execution procedure, reference may be made to the related descriptions of the foregoing embodiments, and details are not described herein again.

Figure 5:
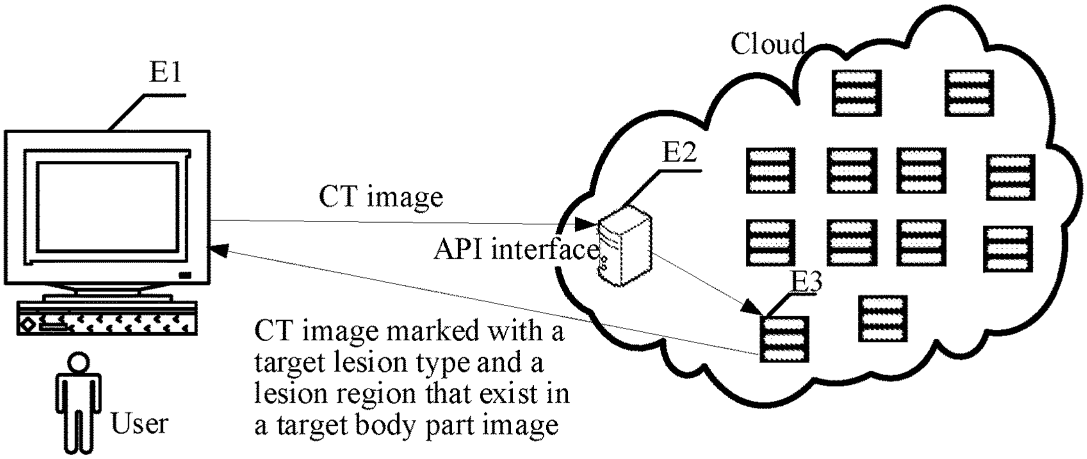
FIG. 5 is a schematic application diagram of an exemplary image detection method, according to some embodiments of the present disclosure.

For the ease of understanding, exemplary descriptions are provided with reference to FIG. 5. A user may invoke an image detection service by using user equipment E1 shown in FIG. 5, to upload a service request including a detection image. In the cloud, as shown in FIG. addition to a plurality of computing nodes, a management node E2 running a management and control service is also deployed. After receiving the service request sent by the user equipment E1, the management node E2 determines a computing node E3 that responds to the service request. After receiving the service request, the computing node E3 executes the foregoing computing procedure, to obtain a detection image marked with a second target lesion type and a lesion region. Then, the computing node E3 sends the detection image with the marked information to the user equipment E1. The user equipment E1 displays the detection image. Based on this, the user can perform further operations such as editing.

An image detection apparatus according to one or more embodiments of the present disclosure is described below in detail. A person skilled in the art may understand that all the apparatuses can be formed by configuring market-selling hardware components through steps instructed in this example.

Figure 6:
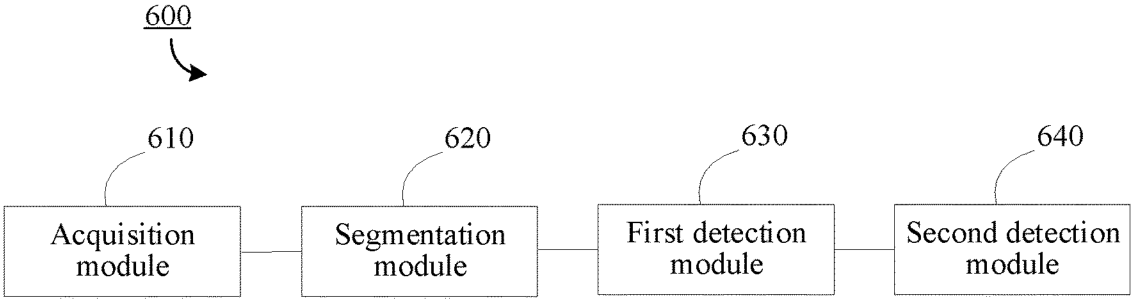
FIG. 6 is a schematic structural diagram of an exemplary image detection apparatus, according to some embodiments of the present disclosure.

FIG. 6 is a schematic structural diagram of an image detection apparatus, according to some embodiments of the present disclosure. As shown in FIG. 6, the apparatus 600 includes an acquisition module 610, a segmentation module 620, a first detection module 630, and a second detection module 640.

The acquisition module 610 is configured to obtain a detection image obtained through plain CT.

The segmentation module 620 is configured to extract a target body part image corresponding to a target body part from the detection image.

The first detection module 630 is configured to perform first image classification and segmentation on the target body part image through a first image detection model to determine that there is a first target lesion type and a lesion region corresponding to the first target lesion type in the target body part image.

The second detection module 640 is configured to perform second image classification and segmentation on the target body part image through a second image detection model, to determine that there is a second target lesion type and a lesion region in the target body part image, where the second target lesion type is a subcategory of the first target lesion type.

In some embodiments, the first image detection model 630 is configured to perform detection for a first group of lesion types. The first group of lesion types includes: a third target lesion type, the first target lesion type, and no lesion that are divided in sequence according to a disease severity corresponding to the target body part. The first target lesion type refers to a collective name of lesion types other than the third target lesion type.

In some embodiments, the first image detection model 630 includes a first feature extraction sub-model and a first classification and segmentation sub-model. The first feature extraction sub-model includes a first encoding module, a first decoding module, and a jumper layer between the first encoding module and the first decoding module. The first detection module 630 is further configured to: extract a first feature map group corresponding to the target body part image through the first encoding module, where the first feature map group includes feature maps of a plurality of scales; input the first feature map group input to the first decoding module through the jumper layer; obtain a second feature map group corresponding to the target body part image through the first decoding module, where the second feature map group includes feature maps of a plurality of scales; and input the second feature map group to the first classification and segmentation sub-model, to perform fusion on the feature maps included in the second feature map group through the first classification and segmentation sub-model, and determine, based on the fused feature map, whether there is a first target lesion type and a lesion region corresponding to the first target lesion type in the target body part image.

In some embodiments, the second image detection model includes a second feature extraction sub-model, a second classification and segmentation sub-model, and a pooling module. The second classification and segmentation sub-model includes a memory unit and an attention module. The memory unit is trained to store positions and visual features corresponding to different lesion types included in the first target lesion type in the target body part, and the memory unit is configured to store the positions and the visual features with a target quantity of memory vectors. The second detection module 640 is further configured to: extract a third feature map group corresponding to the target body part image through the second feature extraction sub-model, where the third feature map group includes feature maps of a plurality of scales; for a target feature map in the feature maps of a plurality of scales, performing the following steps in sequence: perform pooling on the target feature map through the pooling module, to compress the target feature map into the target quantity of feature vectors; perform cross-attention processing on the target quantity of reference vectors and the target quantity of feature vectors through the attention module, perform self-attention processing on the target quantity of reference vectors, and perform summation of a cross-attention processing result and a self-attention processing result, where when the target feature map is the first feature map in the feature maps of the plurality of scales, the reference vector is the memory vector, and when the target feature map is not the first feature map in the feature maps of the plurality of scales, the reference vector is a summation result of a cross-attention processing result and a self-attention processing result corresponding to a previous target feature map; and the target feature map is any one of the feature maps of a plurality of scales; and determine that there is a second target lesion type and a lesion region in the target body part image according to a summation result of a cross-attention processing result and a self-attention processing result corresponding to the last target feature map.

In some embodiments, the second image detection model includes a position embedding module. The second detection module 640 is further configured to: superimpose corresponding position embedding vectors on the target quantity of feature vectors respectively, where a position embedding vector superimposed on any feature vector is used for representing position information corresponding to the any feature vector in the target quantity of feature vectors; and perform, through the attention module, cross-attention processing on the target quantity of reference vectors and the target quantity of feature vectors on which the position embedding vectors respectively corresponding thereto are superimposed.

In some embodiments, the second feature extraction sub-model includes a second encoding module, a second decoding module, and a jumper layer between the second encoding module and the second decoding module. The second detection module 640 is further configured to: extract a fourth feature map group corresponding to the target body part image through the second encoding module; input the fourth feature map group input to the second decoding module through the jumper layer; obtain a fifth feature map group corresponding to the target body part image through the second decoding module; and determine that some feature maps included in the fourth feature map group and some feature maps included in the fifth feature map group form the third feature map group.

In some embodiments, the first image detection model and the second image detection model are respectively used as target image detection models. The apparatus 600 further includes: a training module. The training module is configured to obtain a training sample set used for training the target image detection model; construct a plurality of training sample subset corresponding to the training sample set; and train a plurality of target image detection models respectively through the plurality of training sample subsets.

Based on this, the first detection module 630 is further configured to: perform first image classification and segmentation on the target body part image through a plurality of first image detection models respectively, to obtain respective output results of the plurality of first image detection models; and determine, according to the respective output results of the plurality of first image detection models, whether there is a first target lesion type and a lesion region corresponding to the first target lesion type in the target body part image. The second detection module 640 is further configured to: perform second image classification and segmentation on the target body part image through a plurality of second image detection models respectively, to obtain respective output results of the plurality of second image detection models; and determine, according to the respective output results of the plurality of second image detection models, that there is a second target lesion type and a lesion region in the target body part image.

The apparatus shown in FIG. 6 may perform the steps in the foregoing embodiments. For the detailed execution procedure and technical effects, reference may be made to descriptions in the foregoing embodiments, and details are not described herein again.

Figure 7:
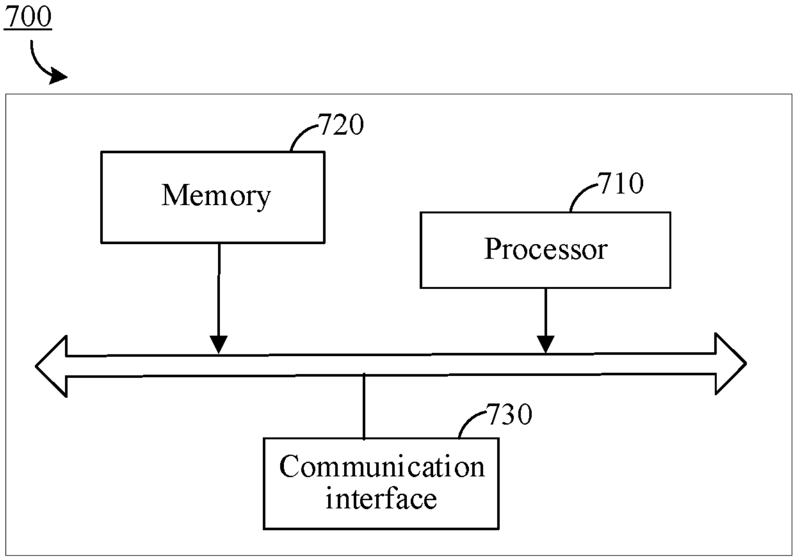
FIG. 7 is a schematic structural diagram of an exemplary electronic device, according to some embodiments of the present disclosure.

In a possible design, the structure of the image detection apparatus shown in FIG. 6 may be implemented as an electronic device. As shown in FIG. 7, the electronic device 700 may include a processor 710, a memory 720, and a communication interface 730. The memory 720 stores executable code, and the executable code, when executed by the processor 710, causes the processor 710 to at least implement the image detection method provided in the foregoing embodiments.

In addition, some embodiments of the present disclosure provide a non-transitory computer-readable storage medium, storing executable code, where the executable code, when executed by a processor of an electronic device, causes the processor to at least perform the image detection method provided in the foregoing embodiments.

In some embodiments, the electronic device 700 configured to perform the image detection method (shown in FIG. 1) provided in the embodiments of the present disclosure may be an extended reality (XR) device. XR is a collective name for various forms such as virtual reality and augmented reality. In this case, the detection image obtained through plain CT can be inputted into the extended reality device. The foregoing first image detection model and second image detection model are set in the extended reality device, which performs, through the two models, the aforementioned image classification and segmentation on the target body part image extracted from the detection image, to finally determine a second target lesion type and a lesion region that exist in the target body part image, and display a detection image marked with the second target lesion type and the lesion region. In this way, both the doctor and the user can see the marked information through the extended reality device.

In an actual application, for the ease of viewing, in some embodiments, after receiving the initially acquired detection image or the detection image with the foregoing marked information, the extended reality device can generate a virtual environment for viewing the detection image more clearly and render and display the detection image in the virtual environment. In addition, during viewing, the doctor and the user can also input interactive operations, such as rotating the detection image and zooming in the detection image, to the extended reality device input. The apparatus embodiment described above is merely exemplary. The units described as separate parts may or may not be physically separate. Some or all of the modules may be selected according to actual requirements to implement the objectives of the methods of the embodiments. A person of ordinary skill in the art may understand and implement the embodiments of this disclosure without creative efforts.

The embodiments may further be described using the following clauses:

1. An image detection method, comprising:
   - acquiring a detection image obtained through computed tomography;
   - extracting a target body part image corresponding to a target body part from the detection image;
   - performing first image classification and segmentation on the target body part image through a first image detection model to determine whether a first target lesion type and a lesion region corresponding to the first target lesion type exist in the target body part image; and
   - performing second image classification and segmentation on the target body part image through a second image detection model to determine whether a second target lesion type and a lesion region corresponding to the second target lesion type exist in the target body part image, wherein the second target lesion type is a subcategory of the first target lesion type.
2. The method according to clause 1, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.
3. The method according to clause 1, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and the performing the first image classification and segmentation on the target body part image through the first image detection model further comprises:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.
4. The method according to clause 1, wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, the memory unit is configured to store the positions and the visual features with a target quantity of memory vectors; and wherein performing the second image classification and segmentation on the target body part image through a second image detection model further comprises:

extracting a third feature map group corresponding to the target body part image through the second feature extraction sub-model, wherein the third feature map group comprises feature maps of a plurality of scales;

processing a target feature map in the feature maps of the plurality of scales in sequence:
   - performing pooling on the target feature map through the pooling module, to compress the target feature map into the target quantity of feature vectors;
   - performing cross-attention processing on the target quantity of reference vectors and the target quantity of feature vectors through the attention module;
   - performing self-attention processing on the target quantity of reference vectors; and
   - performing summation of a cross-attention processing result and a self-attention processing result, wherein when the target feature map is the first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result and a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.
5. The method according to clause 4, wherein the second image detection model further comprises a position embedding module; and the performing cross-attention processing on the target quantity of reference vectors and the target quantity of feature vectors through the attention module comprises:

superimposing corresponding position embedding vectors on the target quantity of feature vectors respectively, wherein a position embedding vector superimposed on any feature vector is used for representing position information corresponding to the any feature vector in the target quantity of feature vectors; and performing, through the attention module, cross-attention processing on the target quantity of reference vectors and the target quantity of feature vectors, wherein the target quantity of feature vectors are superimposed with corresponding position embedding vectors respectively.

6. The method according to clause 4, wherein the second feature extraction sub-model comprises a second encoding module, a second decoding module, and a jumper layer between the second encoding module and the second decoding module; and the extracting a third feature map group corresponding to the target body part image through the second feature extraction sub-model comprises:

extracting a fourth feature map group corresponding to the target body part image through the second encoding module;

inputting the fourth feature map group input to the second decoding module through the jumper layer;

obtaining a fifth feature map group corresponding to the target body part image through the second decoding module; and determining that some feature maps comprised in the fourth feature map group and some feature maps comprised in the fifth feature map group form the third feature map group.

7. The method according to clause 1, wherein the first image detection model and the second image detection model are respectively used as target image detection models, and the method further comprises:

obtaining a training sample set used for training the target image detection model;

constructing a plurality of training sample subset corresponding to the training sample set; and training a plurality of target image detection models respectively through the plurality of training sample subsets.

8. The method according to clause 7, wherein the performing first image classification and segmentation on the target body part image through the first image detection model to determine whether the first target lesion type and the lesion region corresponding to the first target lesion type exist in the target body part image comprises:

performing the first image classification and segmentation on the target body part image through a plurality of first image detection models respectively, to obtain respective output results of the plurality of first image detection models; and determining, according to the respective output results of the plurality of first image detection models, whether the first target lesion type and the lesion region corresponding to the first target lesion type exist in the target body part image; and the performing the second image classification and segmentation on the target body part image through the second image detection model to determine whether the second target lesion type and the lesion region corresponding to the second target lesion type exist in the target body part image comprises:

performing the second image classification and segmentation on the target body part image through a plurality of second image detection models respectively, to obtain respective output results of the plurality of second image detection models; and determining, according to the respective output results of the plurality of second image detection models, whether the second target lesion type and the lesion region corresponding to the second target lesion type exist in the target body part image.

9. The method according clause 1, further comprising:

displaying the detection image marked with the second target lesion type and the lesion region.

10. An apparatus for performing image processing, the apparatus comprising:

a memory configured to store instructions; and one or more processors configured to execute the instructions to cause the apparatus to perform:

acquiring a detection image obtained through computed tomography;

extracting a target body part image corresponding to a target body part from the detection image;

performing first image classification and segmentation on the target body part image through a first image detection model to determine whether a first target lesion type and a lesion region corresponding to the first target lesion type exist in the target body part image; and performing second image classification and segmentation on the target body part image through a second image detection model, to determine whether a second target lesion type and a lesion region corresponding to the second target lesion type exist in the target body part image, wherein the second target lesion type is a subcategory of the first target lesion type.

11. The apparatus according to clause 10, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.

12. The apparatus according to clause 10, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and in performing the first image classification and segmentation on the target body part image through the first image detection model, the one or more processors are further configured to execute the instructions to cause the apparatus to perform:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.

13. The apparatus according to clause 10, wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, the memory unit is configured to store the positions and the visual features with a target quantity of memory vectors; and in performing second image classification and segmentation on the target body part image through a second image detection model, the one or more processors are further configured to execute the instructions to cause the apparatus to perform:

extracting a third feature map group corresponding to the target body part image through the second feature extraction sub-model, wherein the third feature map group comprises feature maps of a plurality of scales;

processing a target feature map in the feature maps of the plurality of scales in sequence:

performing pooling on the target feature map through the pooling module, to compress the target feature map into the target quantity of feature vectors;

performing cross-attention processing on the target quantity of reference vectors and the target quantity of feature vectors through the attention module;

performing self-attention processing on the target quantity of reference vectors; and performing summation of a cross-attention processing result and a self-attention processing result, wherein when the target feature map is the first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result and a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.

14. The apparatus according to clause 10, wherein the first image detection model and the second image detection model are respectively used as target image detection models, the one or more processors are further configured to execute the instructions to cause the apparatus to perform:

obtaining a training sample set used for training the target image detection model;

constructing a plurality of training sample subset corresponding to the training sample set; and training a plurality of target image detection models respectively through the plurality of training sample subsets.

15. The apparatus according to clause 10, wherein the one or more processors are further configured to execute the instructions to cause the apparatus to perform:

displaying the detection image marked with the second target lesion type and the lesion region.

16. A non-transitory computer readable medium that stores a set of instructions that is executable by one or more processors of an apparatus to cause the apparatus to perform:

acquiring a detection image obtained through computed tomography;

extracting a target body part image corresponding to a target body part from the detection image;

performing first image classification and segmentation on the target body part image through a first image detection model to determine whether a first target lesion type and a lesion region corresponding to the first target lesion type exist in the target body part image; and performing second image classification and segmentation on the target body part image through a second image detection model to determine whether a second target lesion type and a lesion region corresponding to the second target lesion type exist in the target body part image, wherein the second target lesion type is a subcategory of the first target lesion type.

17. The non-transitory computer readable medium of clause 16, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.

18. The non-transitory computer readable medium of clause 16, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and in performing the first image classification and segmentation on the target body part image through a first image detection model, the set of instructions that is executable by one or more processors of an apparatus to cause the apparatus to further perform:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.

19. The non-transitory computer readable medium of clause 16, wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, and the memory unit is configured to store the positions and the visual features with a target quantity of memory vectors; and in performing the second image classification and segmentation on the target body part image through a second image detection model, the set of instructions that is executable by one or more processors of an apparatus to cause the apparatus to further perform:

extracting a third feature map group corresponding to the target body part image through the second feature extraction sub-model, wherein the third feature map group comprises feature maps of a plurality of scales;

processing a target feature map in the feature maps of the plurality of scales in sequence:

performing pooling on the target feature map through the pooling module, to compress the target feature map into the target quantity of feature vectors;

performing cross-attention processing on the target quantity of reference vectors and the target quantity of feature vectors through the attention module;

performing self-attention processing on the target quantity of reference vectors; and performing summation of a cross-attention processing result and a self-attention processing result, wherein when the target feature map is the first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result and a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.

20. The non-transitory computer readable medium of clause 16, wherein the first image detection model and the second image detection model are respectively used as target image detection models, the set of instructions that is executable by one or more processors of an apparatus to cause the apparatus to further perform:

obtaining a training sample set used for training the target image detection model;

constructing a plurality of training sample subset corresponding to the training sample set; and training a plurality of target image detection models respectively through the plurality of training sample subsets.

21. An image detection method, comprising:

receiving a request triggered by user equipment by invoking an image detection service, wherein the request comprises acquiring a detection image obtained through computed tomography;

using a processing resource corresponding to the image detection service to perform:

extracting a target body part image corresponding to a target body part from the detection image;

performing first image classification and segmentation on the target body part image through a first image detection model to determine whether a first target lesion type and a lesion region corresponding to the first target lesion type exist in the target body part image;

performing second image classification and segmentation on the target body part image through a second image detection model, to determine whether a second target lesion type and a lesion region corresponding to the second target lesion type exist in the target body part image, wherein the second target lesion type is a subcategory of the first target lesion type; and feeding back the detection image marked with the second target lesion type and the lesion region corresponding to the second target lesion to the user equipment.

22. An apparatus for performing image processing, the apparatus comprising:

a memory configured to store instructions; and one or more processors configured to execute the instructions to cause the apparatus to perform:

receiving a request triggered by user equipment by invoking an image detection service, wherein the request comprises acquiring a detection image obtained through computed tomography;

using a processing resource corresponding to the image detection service to perform:

extracting a target body part image corresponding to a target body part from the detection image;

performing first image classification and segmentation on the target body part image through a first image detection model to determine whether a first target lesion type and a lesion region corresponding to the first target lesion type exist in the target body part image;

performing second image classification and segmentation on the target body part image through a second image detection model to determine whether a second target lesion type and a lesion region corresponding to the second target lesion type exist in the target body part image, wherein the second target lesion type is a subcategory of the first target lesion type; and feeding back the detection image marked with the second target lesion type and the lesion region corresponding to the second target lesion to the user equipment.

23. A non-transitory computer readable medium that stores a set of instructions that is executable by one or more processors of an apparatus to cause the apparatus to perform:

receiving a request triggered by user equipment by invoking an image detection service, wherein the request comprises acquiring a detection image obtained through computed tomography;

using a processing resource corresponding to the image detection service to perform:

extracting a target body part image corresponding to a target body part from the detection image;

performing first image classification and segmentation on the target body part image through a first image detection model, to determine whether a first target lesion type and a lesion region corresponding to the first target lesion type exist in the target body part image;

performing second image classification and segmentation on the target body part image through a second image detection model, to determine whether a second target lesion type and a lesion region corresponding to the second target lesion type exist in the target body part image, wherein the second target lesion type is a subcategory of the first target lesion type; and feeding back the detection image marked with the second target lesion type and the lesion region corresponding to the second target lesion to the user equipment.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above described modules/units may be combined as one module/unit, and each of the above described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. An image detection method, comprising:

acquiring a detection image obtained through computed tomography;

extracting a target body part image corresponding to a target body part from the detection image;

performing first image classification and segmentation on the target body part image through a first image detection model to determine whether a first target lesion type and a lesion region corresponding to the first target lesion type exist in the target body part image; and in response to the first target lesion type existed in the target body part image and the first target lesion type is a non-pancreatic ductal adenocarcinoma (PDAC) type, performing second image classification and segmentation on the target body part image through a second image detection model, to determine whether a second target lesion type and a lesion region corresponding to the second target lesion type exist in the target body part image, wherein the second target lesion type is a subcategory of the first target lesion type, and the second target lesion type comprises at least one of primitive neuroectodermal tumor (PNET), solid pseudopapillary tumor of the pancreas (SPT), intraductal papillary mucinous neoplasm (IPMN), mucinous cystic neoplasm (MCN), chronic pancreatitis (CP), or serous cystadenoma (SCN);

wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, the memory unit is configured to store the positions and the visual features with a target quantity of memory vectors; and wherein performing the second image classification and segmentation on the target body part image through a second image detection model further comprises:

extracting a third feature map group corresponding to the target body part image through the second feature extraction sub-model, wherein the third feature map group comprises feature maps of a plurality of scales;

processing a target feature map in the feature maps of the plurality of scales in sequence:

performing pooling on the target feature map through the pooling module, to compress the target feature map into the target quantity of feature vectors;

performing cross-attention processing on the target quantity of reference vectors and the target quantity of feature vectors through the attention module;

performing self-attention processing on the target quantity of reference vectors; and performing summation of a cross-attention processing result and a self- attention processing result, wherein when the target feature map is a first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.

2. The method according to claim 1, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.

3. The method according to claim 1, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and the performing the first image classification and segmentation on the target body part image through the first image detection model further comprises:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.

4. The method according to claim 1, wherein the second image detection model further comprises a position embedding module; and the performing cross-attention processing on the target quantity of reference vectors and the target quantity of feature vectors through the attention module comprises:

superimposing corresponding position embedding vectors on the target quantity of feature vectors respectively, wherein a position embedding vector superimposed on any feature vector is used for representing position information corresponding to the any feature vector in the target quantity of feature vectors; and performing, through the attention module, cross-attention processing on the target quantity of reference vectors and the target quantity of feature vectors, wherein the target quantity of feature vectors are superimposed with corresponding position embedding vectors respectively.

5. The method according to claim 1, wherein the second feature extraction sub-model comprises a second encoding module, a second decoding module, and a jumper layer between the second encoding module and the second decoding module; and the extracting a third feature map group corresponding to the target body part image through the second feature extraction sub-model comprises:

extracting a fourth feature map group corresponding to the target body part image through the second encoding module;

inputting the fourth feature map group input to the second decoding module through the jumper layer;

obtaining a fifth feature map group corresponding to the target body part image through the second decoding module; and determining that some feature maps comprised in the fourth feature map group and some feature maps comprised in the fifth feature map group form the third feature map group.

6. The method according to claim 1, wherein the first image detection model and the second image detection model are respectively used as target image detection models, and the method further comprises:

obtaining a training sample set used for training the target image detection model; constructing a plurality of training sample subset corresponding to the training sample set; and training a plurality of target image detection models respectively through the plurality of training sample subsets.

7. The method according to claim 6, wherein the performing first image classification and segmentation on the target body part image through the first image detection model, to determine whether the first target lesion type and the lesion region corresponding to the first target lesion type exist in the target body part image comprises:

performing the first image classification and segmentation on the target body part image through a plurality of first image detection models respectively, to obtain respective output results of the plurality of first image detection models; and determining, according to the respective output results of the plurality of first image detection models, whether the first target lesion type and the lesion region corresponding to the first target lesion type exist in the target body part image; and the performing the second image classification and segmentation on the target body part image through the second image detection model, to determine whether the second target lesion type and the lesion region corresponding to the second target lesion type exist in the target body part image comprises:

performing the second image classification and segmentation on the target body part image through a plurality of second image detection models respectively, to obtain respective output results of the plurality of second image detection models; and determining, according to the respective output results of the plurality of second image detection models, whether the second target lesion type and the lesion region corresponding to the second target lesion type exist in the target body part image.

8. The method according claim 1, further comprising:

displaying the detection image marked with the second target lesion type and the lesion region.

9. An apparatus for performing image processing, the apparatus comprising:

a memory configured to store instructions; and one or more processors configured to execute the instructions to cause the apparatus to perform:

acquiring a detection image obtained through computed tomography;

extracting a target body part image corresponding to a target body part from the detection image;

performing first image classification and segmentation on the target body part image through a first image detection model, to determine whether a first target lesion type and a lesion region corresponding to the first target lesion type exist in the target body part image; and in response to the first target lesion type existed in the target body part image and the first target lesion type is a non-pancreatic ductal adenocarcinoma (PDAC) type, performing second image classification and segmentation on the target body part image through a second image detection model, to determine whether a second target lesion type and a lesion region corresponding to the second target lesion type exist in the target body part image, wherein the second target lesion type is a subcategory of the first target lesion type, and the second target lesion type comprises at least one of primitive neuroectodermal tumor (PNET), solid pseudopapillary tumor of the pancreas (SPT), intraductal papillary mucinous neoplasm (IPMN) mucinous cystic neoplasm (MCN), chronic pancreatitis (CP), or serous cystadenoma (SCN);

wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, the memory unit is configured to store the positions and the visual features with a target quantity of memory vectors; and wherein performing the second image classification and segmentation on the target body part image through a second image detection model further comprises:

extracting a third feature map group corresponding to the target body part image through the second feature extraction sub-model, wherein the third feature map group comprises feature maps of a plurality of scales;

processing a target feature map in the feature maps of the plurality of scales in sequence:

performing pooling on the target feature map through the pooling module, to compress the target feature map into the target quantity of feature vectors;

performing cross-attention processing on the target quantity of reference vectors and the target quantity of feature vectors through the attention module;

performing self-attention processing on the target quantity of reference vectors; and performing summation of a cross-attention processing result and a self- attention processing result, wherein when the target feature map is a first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result and a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.

10. The apparatus according to claim 9, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.

11. The apparatus according to claim 9, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and in performing the first image classification and segmentation on the target body part image through the first image detection model, the one or more processors are further configured to execute the instructions to cause the apparatus to perform:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.

12. The apparatus according to claim 9, wherein the first image detection model and the second image detection model are respectively used as target image detection models, the one or more processors are further configured to execute the instructions to cause the apparatus to perform:

obtaining a training sample set used for training the target image detection model; constructing a plurality of training sample subset corresponding to the training sample set; and training a plurality of target image detection models respectively through the plurality of training sample subsets.

13. The apparatus according to claim 9, wherein the one or more processors are further configured to execute the instructions to cause the apparatus to perform:

displaying the detection image marked with the second target lesion type and the lesion region.

14. A non-transitory computer readable medium that stores a set of instructions that is executable by one or more processors of an apparatus to cause the apparatus to perform:

acquiring a detection image obtained through computed tomography;

extracting a target body part image corresponding to a target body part from the detection image;

performing first image classification and segmentation on the target body part image through a first image detection model, to determine whether a first target lesion type and a lesion region corresponding to the first target lesion type exist in the target body part image; and in response to the first target lesion type existed in the target body part image and the first target lesion type is a non-pancreatic ductal adenocarcinoma (PDAC) type, performing second image classification and segmentation on the target body part image through a second image detection model, to determine whether a second target lesion type and a lesion region corresponding to the second target lesion type exist in the target body part image, wherein the second target lesion type is a subcategory of the first target lesion type, and the second target lesion type comprises at least on of primitive neuroectodermal tumor (PNET), solid pseudopapillary tumor of the pancreas (SPT), intraductal papillary mucinous neoplasm (IPMN), mucinous cystic neoplasm (MCN), chronic pancreatitis (CP), or serous cystadenoma (SCN);

wherein the second image detection model comprises a second feature extraction sub-model, a second classification and segmentation sub-model, and a pooling module, the second classification and segmentation sub-model comprises a memory unit and an attention module, the memory unit is trained to store positions and visual features corresponding to different lesion types comprised in the first target lesion type in the target body part, the memory unit is configured to store the positions and the visual features with a target quantity of memory vectors; and wherein performing the second image classification and segmentation on the target body part image through a second image detection model further comprises:

extracting a third feature map group corresponding to the target body part image through the second feature extraction sub-model, wherein the third feature map group comprises feature maps of a plurality of scales;

processing a target feature map in the feature maps of the plurality of scales in sequence:

performing pooling on the target feature map through the pooling module, to compress the target feature map into the target quantity of feature vectors;

performing cross-attention processing on the target quantity of reference vectors and the target quantity of feature vectors through the attention module;

performing self-attention processing on the target quantity of reference vectors; and performing summation of a cross-attention processing result and a self- attention processing result, wherein when the target feature map is a first feature map in the feature maps of the plurality of scales, the reference vector of the target feature map is the memory vector of the target feature map, and when the target feature map is not the first feature map in the feature maps of the plurality of scales, the reference vector of the target feature map is a summation result of a cross-attention processing result and a self-attention processing result corresponding to a previous target feature map; and the target feature map is any one of the feature maps of a plurality of scales; and determining whether the second target lesion type and the lesion region corresponding to the second target lesion exist in the target body part image according to a summation result of a cross-attention processing result and a self-attention processing result corresponding to a last target feature map.

15. The non-transitory computer readable medium of claim 14, wherein the first image detection model is configured to perform detection for a first group of lesion types, and the first group of lesion types comprises: a third target lesion type, the first target lesion type, and no lesion that are divided in sequence according to a disease severity corresponding to the target body part, wherein the first target lesion type refers to a collective name of lesion types other than the third target lesion type.

16. The non-transitory computer readable medium of claim 14, wherein the first image detection model comprises a first feature extraction sub-model and a first classification and segmentation sub-model, the first feature extraction sub-model comprises a first encoding module, a first decoding module, and a jumper layer between the first encoding module and the first decoding module; and in performing the first image classification and segmentation on the target body part image through a first image detection model, the set of instructions that is executable by one or more processors of an apparatus to cause the apparatus to further perform:

extracting a first feature map group corresponding to the target body part image through the first encoding module, wherein the first feature map group comprises feature maps of a plurality of scales;

inputting the first feature map group to the first decoding module through the jumper layer;

obtaining a second feature map group corresponding to the target body part image through the first decoding module, wherein the second feature map group comprises feature maps of a plurality of scales;

inputting the second feature map group to the first classification and segmentation sub-model, to perform fusion on the feature maps comprised in the second feature map group through the first classification and segmentation sub-model; and determining, based on the fused feature map, whether the first target lesion type and the lesion region corresponding to the first target lesion type exist in the target body part image.

17. The non-transitory computer readable medium of claim 14, wherein the first image detection model and the second image detection model are respectively used as target image detection models, the set of instructions that is executable by one or more processors of an apparatus to cause the apparatus to further perform:

obtaining a training sample set used for training the target image detection model; constructing a plurality of training sample subset corresponding to the training sample set; and training a plurality of target image detection models respectively through the plurality of training sample subsets.

* * * * *